May 18, 1965   R. R. CAMPBELL ETAL   3,183,810
AUTOMATIC ANGLE CONTROL DEVICE FOR PANORAMIC CAMERA
Filed June 27, 1962                    2 Sheets-Sheet 1

INVENTORS
Ronell R. Campbell
Robert Inguste
BY
Emery, Whittemore
Sandoe & Graham
ATTORNEYS.

May 18, 1965   R. R. CAMPBELL ETAL   3,183,810
AUTOMATIC ANGLE CONTROL DEVICE FOR PANORAMIC CAMERA
Filed June 27, 1962   2 Sheets-Sheet 2
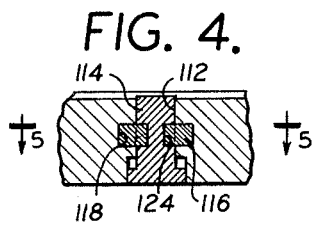
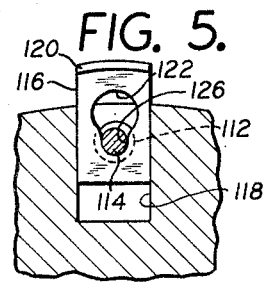
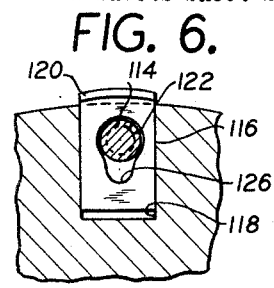
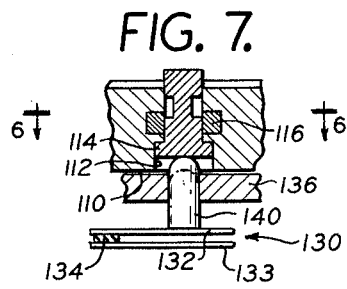
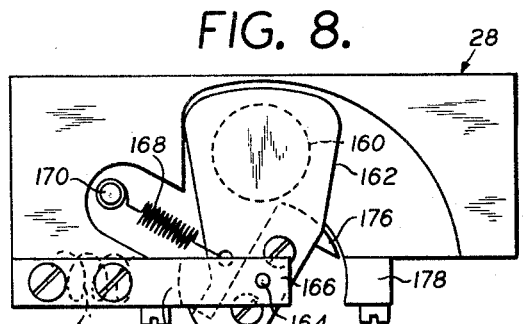
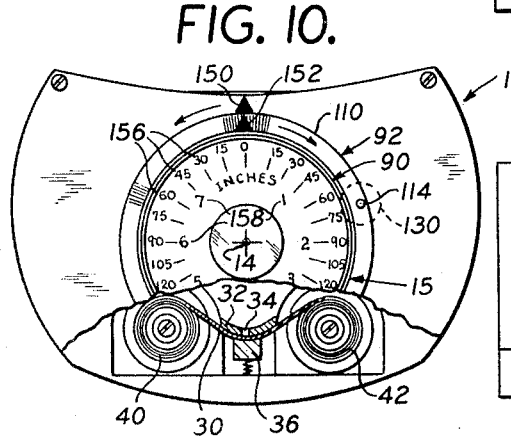
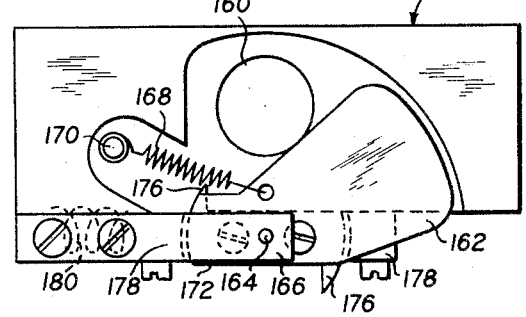
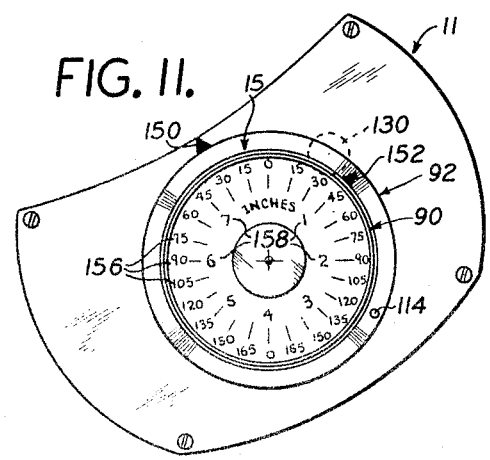
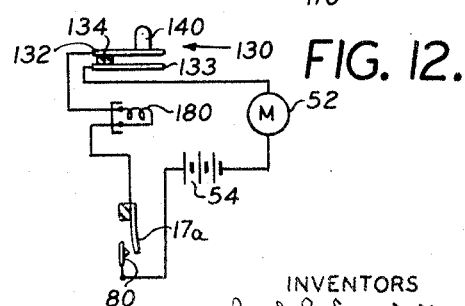
INVENTORS
Ronald R. Campbell
Robert Auguste
BY
Emery, Whittemore,
Dunkel & Graham
ATTORNEYS.

United States Patent Office 3,183,810
Patented May 18, 1965

3,183,810
AUTOMATIC ANGLE CONTROL DEVICE FOR PANORAMIC CAMERA
Rouel R. Campbell, Canoga Park, and Robert Auguste, Granada Hills, Calif., assignors, by mesne assignments, to Bank of America National Trust and Savings Association
Filed June 27, 1962, Ser. No. 205,756
16 Claims. (Cl. 95—16)

This invention relates to cameras and more especially to panoramic cameras that can be held by hand when in operation; and to cameras that have control for the width of the picture so that the same camera can be used for taking pictures of conventional size or for taking panoramic pictures.

It is an object of the invention to provide an improved panoramic camera that operates with film exposures fast enough to make practical the holding of the camera by hand when in use, and with provision for obtaining sharp edges at both ends of the picture and exposures that are not distorted at the ends of the picture by acceleration or deceleration of the camera.

Another object is to equip a panoramic camera with automatic means for stopping the angular sweep of the camera and with adjustments for changing the angle of sweep and for making the sweep symmetrical or unsymmetrical in any desired ratio about a reference point. The automatic control can be rendered inoperative and when the automatic control is not operating the camera can sweep any desired angle up to and exceeding 360 degrees of arc.

Still another object is to provide an angle-of-sweep indicator on the camera with indications of the number of inches of film used for different angular extent of pictures; and to combine such an indicator with a camera that also has an indicator that shows the number of inches (or other length units) of film that have already been exposed or that remain to be exposed. If the sweep indicator is graduated in inches of film the indicator for the amount of film in the camera is preferably graduated in the same units.

In the preferred embodiment of the invention, the camera is of the type in which the rotation of the camera is about a principal point of the lens so that the image at the focal plane is stationary in space as the camera rotates, and the film is wrapped around a guide at the focal plane and is held stationary at the region of exposure. Although the film is exposed through an aperture slot and theoretically no shutter is necessary, there is a shutter with automatic correlation with the sweep mechanism so that exposures are not affected by the acceleration and deceleration of the camera at the beginning and end of a panoramic picture; and so that the camera can overrun the intended angular limit when the motion is rapid for short exposures and the motor coasts to some degree after the power is shut off.

Other objects, features and advantages of the invention will appear or be pointed out as the description proceeds.

In the drawing, forming a part hereof, in which like reference characters indicate corresponding parts in all the views:

FIGURE 4 is an enlarged sectional view taken on the line 4—4 of FIGURE 3;

FIGURE 5 is a sectional view taken on the line 5—5 of FIGURE 4;

FIGURE 6 is a view similar to FIGURE 5 but showing the parts in defferent positions, FIGURE 6 being taken on the line 6—6 of FIGURE 7;

FIGURE 7 is a diagrammatic sectional view part of which is similar to FIGURE 4 but with the parts in different positions and the other part of which shows switch means with which the structure of FIGURE 4 cooperates;

FIGURE 8 is a diagrammatic view of the shutter mechanism of the camera shown in the other views, this view being taken at approximately the line 8—8 of FIGURE 3;

FIGURE 9 is a view similar to FIGURE 8 but showing the shutter in open position;

FIGURE 10 is a top plan view of the camera before setting the automatic control for determining the angle of sweep;

FIGURE 11 is a view similar to FIGURE 10 but showing the various elements in position for determining a particular angle of sweep; and FIGURE 12 is a wiring diagram for the camera shown in the other views.

Figure 1:
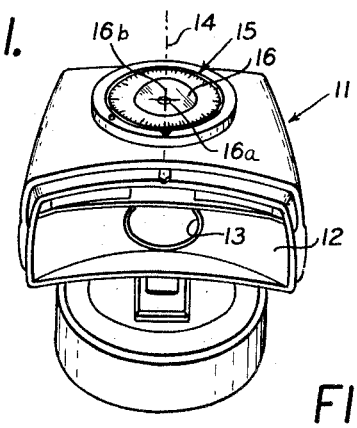
FIGURE 1 is a perspective view showing a camera made in accordance with this invention.

FIGURE 1 shows a panoramic camera 11 having a recessed front wall 12 with a center opening 13 in which the lens of the camera is located. The camera rotates about an axis 14 which is vertical when the camera is being used, and this axis preferably extends through a principal point of the camera lens so that the image at the focal plane of the camera remains stationary in space while the camera rotates about its axis. In such a camera, the film is wrapped progressively around the focal plane ahead of the image and is wound on a take-up spool as the lens moves to expose subsequent portions of the film to other parts of the scene that is being photographed. Thus the portion of the film which is being exposed is, like the image, stationary in space.

There is an angle indicator 15 on top of the camera, and this angle indicator can be set to control the angle of sweep of the camera for each operation. The construction and operation of this angle indicator and that of the bearings on which the camera moves and the mechanism for operating it will be explained in connection with other views.

The camera 11 exposes the film through a slot aperture at the focal plane and the width of the aperture is correlated with the angular speed of the camera so as to obtain the desired exposure. In the preferred construction, the exposure time is short enough to permit the camera to be held by hand when taking a picture; for example, the exposure may be one fiftieth of a second and should not be less than one twenty-fifth of a second for hand operation.

A spirit level 16 on top of the housing has a transparent top wall of the spherical contour, and bubble 16a moves into a center position under cross marks 16b when the camera is level.

Figure 2:
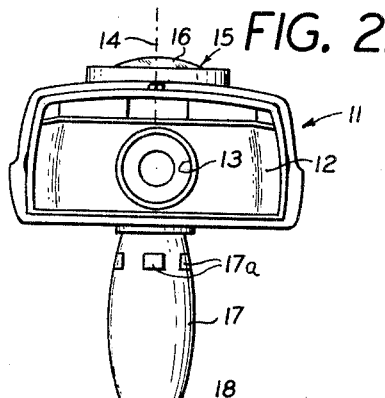
FIGURE 2 is a front view, on a reduced scale, showing the camera of FIGURE 1 attached to a handle.

A handle 17 is connected to the bottom of the camera 11 in Figure 2. In some cameras this handle has been of the pistol grip type, but in Figure 2, it is of a barrel shaped contour and of a size to be conveniently gripped in one hand. By having the handle 17 symmetrical about its longitudinal axis, it can be gripped in any position as necessary to point the camera 11 at the object to be photographed. The lower end of the handle 17 is constructed so as to connect in the conventional way with a tripod 18 when the operator prefers to use a tripod. Buttons 17a at angularly spaced locations around the handle 17 can be pushed to operate the camera. By having several buttons 17a at different locations around the handle 17, there is always one in a convenient position to be pushed by the thumb or a finger of the hand that grips the handle and regardless of which way the handle is turned to face the camera of the subject.

Figure 3:
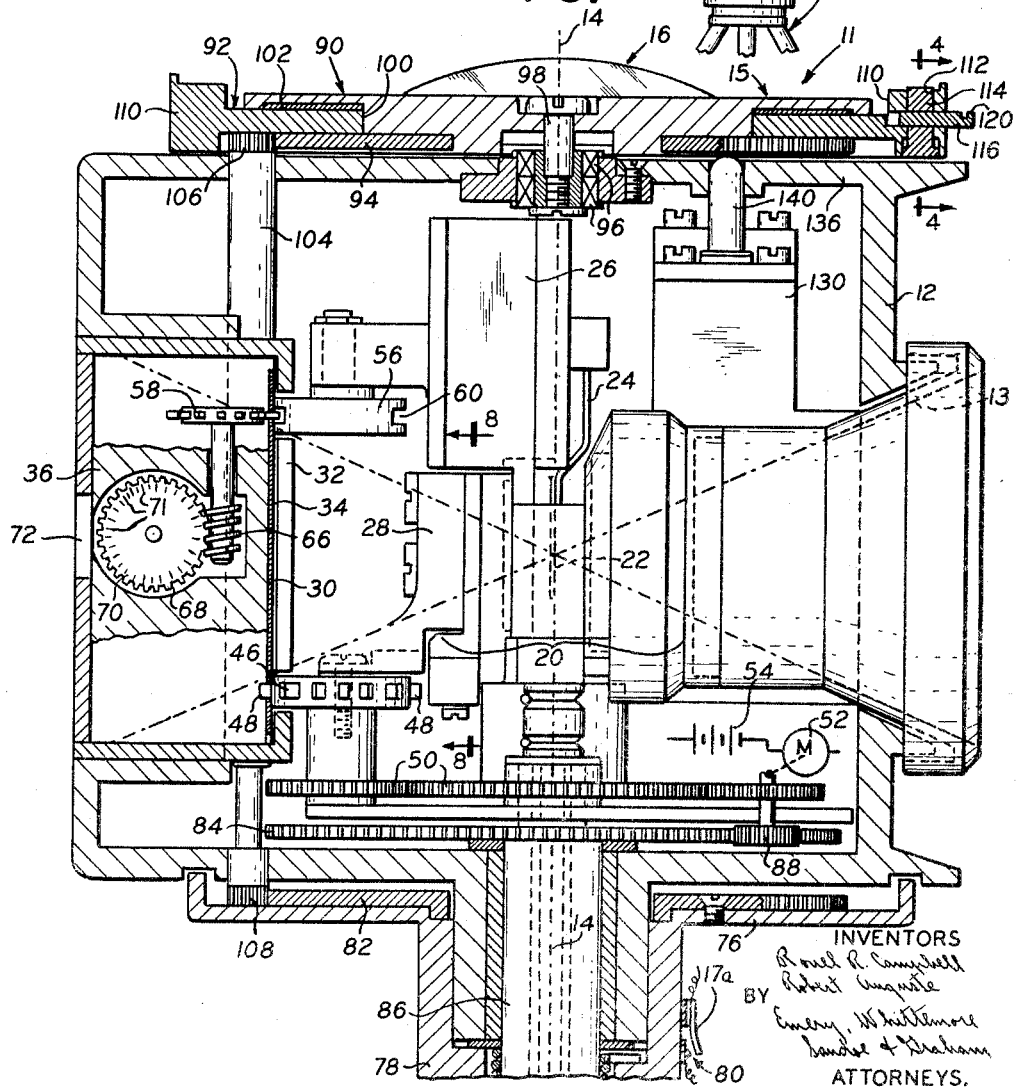
FIGURE 3 is an enlarged, diagrammatic sectional view through the camera shown in FIGURE 1.

FIGURE 3 shows the interior of the camera and portions of the construction are shown diagrammatically where the actual construction is not important for a complete understanding of this invention. The camera has a lens which is preferably of composite construction and located within a lens housing 20. There is an iris diaphragm 22 within the lens housing and this iris diaphragm is controlled by an operator 24 extending upwardly to a housing 26 in which there is automatic mechanism for operating the iris in accordance with light received by a cell, in accordance with conventional practice.

The shutter for the camera is located within a portion 28 of the lens housing and the operation of this shutter will be explained in connection with other views of the drawing. A film 30 is located at the focal plane of the camera and this film is held in the focal plane of the camera by a guide plate 32 having a slot or aperture 34 through which the film is exposed.

The guide 32 and the slot 34 are best shown in FIGURE 10. The film 30 is held against the guide 32 by a pressure block 36 having a spring 38 behind it for exerting a force through the block 36 against the film 30.

The film 30 unwinds from a supply spool 40 and wraps around a take-up spool 42. The take-up spool 42 is rotated by a motor through a slip clutch which turns the take-up spool 42 fast enough to always maintain some tension on the film regardless of the amount of film on the spool and the resulting diameter of the reel of film on the spool 42.

Referring again to FIGURE 3, the film 30 is advanced with respect to the guide 32 and the aperture slot 34 by a sprocket 46 having teeth 48 which engage in apertures in the film for feeding the film in the usual manner. This sprocket 46 is driven through a gearing, indicated generally by the reference character 50, from an electric motor 52 powered by a battery 54.

There is a roller 56 in contact with the upper portion of the film 30, and this roller 56 holds the film 30 against another sprocket 58 having teeth which extend through the sprocket apertures of the film and into a circumferential groove 60 in the roller 56. This sprocket 58 is secured to the upper end of a shaft 62 that rotates in bearings in the pressure block 36. A worm 66 on the shaft 62 engages a worm wheel 68 that forms the periphery of a cylinder 70 located in a recess in the pressure block 36.

This cylinder 70 has graduations 71 which indicate the amount of film that has been used by the camera and there is a window 72 in the back of the camera and through which the graduations on the cylinder 70 are visible. Graduations 71 are preferably inches of film, but other linear designations can be used.

The camera has a stationary base 76 which connects with a handle or tripod; and in FIGURE 3 the base has a downwardly extending portion 78 on which a switch 80 is located. This switch is shown diagrammatically and a button 17a is also shown diagrammatically, it being understood that ordinarily this button and switch will be located lower on the camera.

A lower stationary gear 82 is attached to the base 76. There is an upper stationary gear 84 attached to a shaft 86 which extends upwardly through the bottom of the camera. These gears 82 and 84, and the shaft 86, have their axes coincident with the axis 14 about which the camera rotates. The camera is rotated mechanically by the motor 52 through a gear 88 that meshes with the upper stationary gear 84. This gear 88 rolls around the periphery of the stationary gear 84 and produces the angular movement of the camera about the axis 14.

The gearing 50 turns the sprocket 46 in a direction and at a speed which compensates the movement of the camera about its axis 14. The portion of the film 30 which is located at the exposure aperture 34 moves relative to the guide 32 and relative to the camera but by moving in the opposite direction and at a controlled speed, the portion of the film at the aperture actually remains stationary in space and the film is, in effect, wrapped around the focal plane of the camera as the aperture slot 34 moves angularly about the axis of the camera and as a unit with the camera housing.

FIGURE 3 shows the angle indicator 15 in sections. This angle indicator has an upper disc 90 and a lower disc 92. The upper disc is connected to a gear 94 and there are bearings 96 connected with an axle 98 of the upper disc 90. The lower disc 92 is located with its inner portion between the upper disc 90 and the gear 94. The upper disc 92 has an inner surface 100 which bears against a shoulder of the upper disc 90 to prevent radial displacement of the lower disc 92 with respect to the upper disc 90 and with respect to the axis 14. Confronting faces of the upper disc 90 and the gear 94 provide bearing surfaces for preventing vertical displacement of the lower disc 92 with respect to the assembly. There is preferably a friction washer 102 for preventing the lower disc 92 from moving too freely with respect to the upper disc 90 and the gear 94.

A shaft 104 has a pinion gear 106 at its upper end in mesh with the gear 94; and this shaft 104 has another pinion gear 108 secured to its lower end and in mesh with the stationary gear 82 on the base 76 of the camera. As the camera housing rotates about the axis 14, the pinion gear 108 rolls around the stationary gear 82 and this causes a rotation of the shaft 104 and a rotation of the pinion gear 106 which is at the top of the shaft 104. The rotation of the pinion 106 causes the gear 94 to move with respect to the gear 106 but this gear 94 is of the same size as the stationary gear 82 and the pinions 106 and 108 are of the same size. The result is a rotation of the gear 106 at a rate which actually holds the gear 94 stationary as the camera rotates. Even if the gear 94 were not of the same size as the gear 82, the pinion gears 106 and 108 could be correlated so as to maintain the gear 94 stationary in space while the camera casing rotates about the axis 14.

Since the upper disc 90 is secured to the gear 94, this disc 90 also remains stationary while the camera casing rotates, and the lower disc 92 is held stationary by friction between the washer 102 and the top face of the disc 92. However, the lower disc 92 can be manually adjusted to change its angular relation with the upper disc 90, about the axis 14, whenever the camera is to be adjusted to take pictures of different angular extent. Whatever the adjustment of the lower disc 92 with respect to the upper disc 90, the friction washer 102 will hold the discs 90 and 92 in the angular relation to which they are set until their relative positions are again changed by manual adjustments.

The lower disc 92 has a rim 110 and at one location around this rim 110 there is an opening 112 in which a plunger 114 is located. This plunger 114 moves up and down in the opening 112 and is shown in its upper position in FIGURE 4 and in its lower position in FIGURE 7.

A plate 116 extends into a slot 118 that opens through the periphery of the rim 110. At the outer end of the plate 116 there is a tab 120 by which the plate can be moved radially inward or outward with respect to the plunger 114. There is a large opening 122 (FIGS. 5 and 6) in the plate 116. This large opening 122 is of substantially the same diameter as the opening 112 and it permits the plunger 114 to move up and down freely when the plate 116 is in position to align the opening 122 with the opening 112.

The plunger 114 has a mid portion 124 which is of reduced diameter. There is a slot 126 in the plate 116 and extending inwardly from the opening 122. This slot 126 has a width substantially less than the full diameter portion of the plunger 114 but wide enough to extend around the mid portion 124 of the plunger. When the plunger is in position with its mid portion 124 at the level of the plate 116, the plate can be pulled outwardly, as shown in FIGURE 5, to bring the slot 126 around the mid portion 124 of the plunger 114 and this prevents the plunger from moving upwardly in the opening 112. FIGURE 3 shows the plunger 114 held in its downward position by the plate 116 when the plate is pulled outward into the position shown in plan view in FIGURE 5.

The camera has a switch 130, shown diagrammatically in FIGURE 7, which includes leaf spring contacts 132 and 133 secured at one end to a fixed block 134. These spring contacts 132 and 133 are normally spaced from one another as illustrated. The switch 130 has an actuator 140 extending upwardly through the wall 136 and which serves as the operating element for the switch 130. The spring contact 132 holds the actuator 140 in its raised, full-line position when the switch 130 is open. The actuator 140 is held in its lowered position by the rim 110 at all times except when the actuator 140 is under the opening 112. If the plunger 114 is free to move upwardly, the spring 132 will push the actuator 140 up into the opening 112, raising the plunger 114 in the opening 112 so that the upper part of the plunger 114 projects above the rim 110.

This upwardly projecting end of the plunger 114 constitutes a button; and when the switch 130 is to be closed again, the button is pushed downward and the actuator 140 is displaced from the opening 112 so that the upper end of the actuator 140 is low enough to again come over the rim 110 as the rim and camera casing are moved relative to one another to reset the apparatus for taking another picture.

Since the rim 110 holds the actuator 140 in its downward position, and keeps the switch 130 closed at all times, except when the actuator comes under the opening 112 in the rim 110, the actuator 140 and switch 130, in co-operation with this opening 112, constitute an automatic stop for limiting angular movement of the casing about its axis of rotation.

FIGURE 10 is a top plan view of the angle indicator 15. There is an arrow 150 on top of the camera for indicating the direction in which the camera is facing. There is another arrow 152 on the rim 110 of the plate or disc 92. When the arrow 152 is in line with the arrow 150, then the opening 112 in the rim 110, is in position to permit the switch 130 to open and break the circuit of the motor and stop further rotation of the camera.

When the plunger 114 is in its lowered position, and is held in that position by pulling the slide 116 out into the position shown in FIGURE 5, the plunger 114 can not rise in the opening 112 and the actuator 140 can not move upward into the opening 112. Thus, the slide 116, when used to hold the plunger 114 in its downward position, constitutes a means for rendering the automatic stop inoperative.

The upper plate or disc 90 (FIGURE 10) has graduations 156 representing angles of movement about the axis 14. This plate or disc 90 also preferably has other graduations 158 representing inches of film that are exposed by movement of the camera through corresponding angles indicated by the graduations 156.

FIGURE 11 shows the camera adjusted to take a picture having an extent of 75 degrees. The camera is facing an angle of approximately 30 degrees to the left of a center position, as indicated by the arrow 150 with respect to the angle scale on the plate or disc 90. The other plate or disc 92 has been moved so as to locate the plunger 114 where it will not be reached by the actuator 140 of the switch 130 until the camera has travelled to a location 45 degrees to the right of the center line through the zero indication on the scale. Thus the camera moves 30 degrees on one side of the center line and 45 degrees on the other side, making a total sweep of 75 degrees.

From FIGURE 11 it will be evident that the camera can be turned in any position, as indicated by the arrow 150, and the rim 110 of the plate or disc 92 can be moved to any other angular position, as indicated by the arrow 152, so as to take pictures of any desired angular extent and with any portion of the picture on the right or on the left of the zero position of the angle scale, or with the entire picture located on one side or the other of the zero scale and at any portion of the circumference of the plate or disc 90.

Since the speed at which the camera rotates about its axis 14 determines the exposure of the film, and in order to prevent a longer exposure while the camera is starting and stopping, the camera is preferably equipped with the shutter shown in FIGURES 8 and 9. The dotted circle 160 represents the lens opening at the shutter. The shutter itself consists of a plate 162 rotatable about an axle 164 carried at its opposite end by a frame 166. The shutter plate 162 is normally held in closed position by a spring 168 having its lower end attached to the shutter plate 162 and its upper end attached to a fixed anchor 170.

There is an armature 172 attached rigidly to the shutter blade 162 and this armature moves into the position shown in FIGURE 9 when the pole pieces 178 are energized. A coil 180 supplies electric current to energize the pole pieces 178 when the shutter is to be opened.

FIGURE 12 shows a simplified wiring diagram for the camera. The motor 52 receives power from the battery 54 when the button 17a is operated to close the switch 80.

From the switch 80 power is supplied to the coil 180 of the shutter and then to the switch 130. Whenever the actuator 140 of the switch 130 is depressed to close the switch 130, closing of the manually-operated switch 80 opens the shutter and operates the motor 52 to swing the camera casing.

Opening of the switch 130 breaks the circuit through the shutter coil 180 and this permits the shutter to close instantly so that no light reaches the film while the camera slows down and stops.

The preferred embodiment of the invention has been illustrated and described, but changes and modifications can be made and some features can be used in different combinations without departing from the invention as defined in the claims.

What is claimed is:

1. In a panoramic camera, a housing for holding film and having a lens through which the film is exposed, a stationary base under the housing and on which the housing moves angularly about a substantially vertical axis, motor means for moving the housing about said axis, an adjustable automatic stop for determining the angle of movement of the camera housing about said axis and for determining the resulting width of the scene photographed by the camera, said stop including two elements located on top of the camera and the first of which is stationary and the second of which moves as a unit with the camera but is adjustable with respect to the camera and angularly about said axis, an electric switch operable to stop the motor means, a surface on one of said elements for operating the switch when said elements come into a predetermined position with respect to one another, said surface having an actuator movable into and out of position for actuating the switch and a manually-actuated handle that shifts the initial position of the element that moves with the camera to change the angle of relative movement required of said elements to bring them to said predetermined position.

2. The panoramic camera described in claim 1 and characterized by the vertical axis of rotation passing through the principal point of the lens, a holder for the film and film winding mechanism that advances the film with respect to the housing and in an opposite direction to the movement of the housing and at a rate which compensates the movement of the housing and maintains the film stationary in space at the location where the film is being exposed during the operation of the camera.

3. The panoramic camera described in claim 1 and characterized by the switch means being located in the camera housing and movable as a unit with the housing as said housing moves about the axis, an actuator carried by one of said elements and having an end face that constitutes one of said complementary surfaces, the actuator being movable, with respect to the element by which it is carried, into a position that makes the actuator inoperative to operate the switch means, and an adjustable interference for holding the actuator in inoperative position.

4. The panoramic camera described in claim 3 and characterized by one of the relatively movable elements being a disc which is located above the switch means, the actuator being a plunger carried by the disc and movable up and down with respect to the disc to shift the actuator into and out of the path of a portion of the switch means.

5. A panoramic camera including, in combination a camera housing having a lens axis, a motor for rotating the camera housing about an axis, an element on the housing above the axis of the lens, driving means on the housing that rotate said element with respect to the housing and about the same axis as that of the housing and at the same speed as the housing but in the opposite direction whereby said element remains stationary in space while the camera housing rotates, an automatic stop for terminating the rotary movement of the camera housing, including cooperating parts, one of which is carried on the stationary element and the other of which is carried by the housing and is movable therewith.

6. The panoramic camera described in claim 5, characterized by one of said cooperating parts being movable into an operative position with respect to the other as the camera housing rotates, means for stopping the motor operated by one of said cooperating parts as said parts come into operative position with respect to one another.

7. The panoramic camera described in claim 5, characterized by a stationary base for the camera, a gear secured to the base, a pinion gear that rolls around the stationary gear and imparts the rotating movement to the camera housing, another pinion gear that rolls on the stationary gear, a shaft secured at one end to the other pinion gear, a third pinion gear secured to the other end of the shaft, and a second stationary gear at the top of the camera housing and to which said element on the housing is connected, the second stationary gear being in mesh with the third pinion gear and being rotatable thereby with respect to the housing and in the opposite direction at a rate which holds said second stationary gear stationary in space as the camera housing rotates.

8. The panoramic camera described in claim 6, characterized by a connection between said element on the housing and the co-operating part that is carried by said element, the connection being angularly adjustable to change the angular position of the co-operating part with respect to the element by which the part is carried and thereby to adjust the extent of angular movement of the camera housing required to bring the co-operating parts into operative position with respect to one another.

9. The panoramic camera described in claim 6, characterized by a shutter in the camera housing controlling the exposure of a film in the housing, and shutter-operating mechanism responsive to the operation of the automatic stop to close the shutter upon operation of the automatic stop.

10. The panoramic camera described in claim 9, characterized by an electric circuit for supplying power to the motor, electro-magnetic means for operating the shutter, the automatic stop including switch means in the circuits of the motor and the electro-magnetic means for operating the shutter.

11. The panoramic camera described in claim 10, characterized by a spring for holding the shutter in closed position, the electro-magnetic means for operating the shutter acting against the force of said spring to open the shutter, and the force of the spring being correlated with the electro-magnetic means to close the shutter while the motor continues coasting whereby the shutter closes before the camera housing stops its angular movement about its axis of rotation.

12. A panoramic camera including, in combination, a camera housing having a substantially horizontal lens axis, a motor for rotating the camera housing about a substantially vertical axis, means for holding a film at an exposure station in line with the lens axis and rearward of said vertical axis of rotation of the housing, an element on the housing above the lens axis, means for holding said element stationary as the camera housing rotates, contiguous surfaces on the camera and said element, angle indications on one of said contiguous surfaces, and a reference mark on the other of said surfaces for measuring the angle of movement of the camera housing with respect to the stationary element, the camera housing being movable into different starting positions with respect to the stationary element.

13. The panoramic camera described in claim 12, characterized by other indications on one of the contiguous surfaces showing the length of film used by the camera for various angles of rotation designated by the angle indications.

14. The panoramic camera described in claim 13, characterized by a film footage indicator in the camera housing and a window in the housing through which the footage indicator is visible for determining the amount of film remaining to be exposed.

15. The panoramic camera described in claim 12, and in which there is a spherical spirit level adjacent to the element on the housing for indicating when the housing is level and ready for operation.

16. The panoramic camera described in claim 12, characterized by an automatic stop for terminating the rotary movement of the camera housing including co-operating parts, one of which is carried on the stationary element and the other of which is carried by the housing and is rotatable therewith.

References Cited by the Examiner

UNITED STATES PATENTS

| | | | |
|---|---|---|---|
| 1,449,295 | 3/23 | Richards | 95—15 |
| 1,503,437 | 7/24 | James | 95—15 |
| 2,111,854 | 3/38 | Gasso | 95—15 |
| 2,349,931 | 5/44 | Back | 95—17 |
| 2,815,701 | 12/57 | Back | 95—17 |
| 2,993,424 | 7/61 | Koubek | 95—15 |

NORTON ANSHER, *Primary Examiner.*

DELBERT B. LOWE, *Examiner.*